Patented June 21, 1927.

1,633,292

UNITED STATES PATENT OFFICE.

STANLEY DE VRIES SHIPLEY, OF STAMFORD, CONNECTICUT, ASSIGNOR TO ATLAS POWDER COMPANY, OF WILMINGTON, DELAWARE, A CORPORATION OF DELAWARE.

PROCESS FOR REDUCING THE VISCOSITY OF NITROCELLULOSE AND OTHER CELLULOSE ESTERS.

No Drawing.     Application filed March 14, 1925.  Serial No. 15,682.

When dissolving nitrocellulose, celluloid, acetyl cellulose, and other cellulose-esters in their solvents, as for instance, ether-alcohol, amyl acetate, butyl acetate, ethyl acetate, methyl acetate, ketones and all other solvents of said cellulose-esters, very viscous solutions are obtained, which, even in case of small percentages of dissolved substance, are so thick that they are incapable of flowing.

Several methods have been proposed for the treatment of the cellulose prior to nitration or other chemical treatments, having for their object, to bring about such modification of the cellulose as to reduce the viscosity of solutions made therefrom. Said methods comprise, (a), heating the cellulose in inert gases and liquids, at varying temperatures and pressures, (b) heating in alkaline solution of these liquids such as water or ethyl alcohol, (c) nitration of the cellulose at higher temperatures than is the usual custom. In addition, heating the nitrocellulose or other cellulose-ester, after being dissolved in a suitable solvent has been proposed and practised. All these methods lower the viscosity to a greater or less extent, but are costly and mechanically difficult. The cellulose is liable to burn when heated in inert gases, and there is considerable loss when it is nitrated. Heating in alkali is expensive, not only because of the alkali-hydroxide used, but because the cellulose dissolves in the hydroxide and is thus lost. Further loss results when cellulose thus treated is nitrated. When cellulose is nitrated at temperatures higher than is the usual custom, considerable loss results because the hot nitrating acid dissolves a large percent of the cellulose. Finally, when a solution of nitrocellulose, or other cellulose-ester, is heated under pressure, as much as 1% of free acid is developed, which acid must be removed before the solution can be used; a decided fire risk is involved and the method is difficult and cumbersome to perform, requiring many and very expensive machines.

Said methods, even when combined and carried to the utmost limit, do not afford, for certain technical and manufacturing purposes, any satisfactory result in respect to reduced viscosity.

In a co-pending application, Serial Number 567,171, filed June 9, 1922, I described a method for decreasing the viscosity of nitrocellulose esters before being dissolved, in which process the nitrocellulose is heated to a temperature essentially above 100° C., in the presence of a non-solvent, such as water, for example and in the presence of a catalyst.

The object of my present process is to provide a means whereby it will be possible to reduce the viscosity of nitrocellulose before being dissolved, without the necessity of carrying the temperature above 100° C., without consuming an excessive amount of time and without producing a degree of acidity in the heating-water. By this process, easily flowing solutions of nitrocellulose of very low viscosity may be obtained.

I have discovered that when nitrocellulose is heated in water for a considerable length of time, either at the boiling point of water or, at an elevated temperature under pressure, (as by heating in a closed vessel or tank), a small amount of decomposition takes place and liberates a small amount of acid from the nitrocellulose. I have also discovered that the effect of this acid may be minimized if I dissolve certain buffer compositions in the water in which the nitrocellulose is being heated.

If the buffer composition added produces a $pH$ too high, for example as high as that produced by soda ash or sodium carbonate, the resulting nitrocellulose will be very much off color and poor in quality. The $pH$ value of a sodium carbonate solution is as follows:

| Concentration. | | |
|---|---|---|
| Mols. per liter. | Grams per liter. | $pH$. |
| 0.20 | 21.2 | 11.8 |
| 0.05 | 5.3 | 11.41 |

If, however, the $pH$ be not greater than 8.5 and not less than 3.1, the resulting nitrocellulose is very high in quality and color. I have also discovered that this addition of buffer composition obviates the necessity of heating the mixture of water and nitrocellulose to a temperature above 100° C.

Since there are many compounds which may be used to produce the desired $pH$, I do not care to be limited as to whether I use mixtures of borax and acetic acid, or stearic acid and soluble phosphates, or phthalates of the alkali metals. The $pH$ is the essential thing to be controlled.

The $pH$ value is defined by the following equation:

$$pH = \log \frac{1}{(H+)}$$

wherein $(H+)$ represents the hydrogen ion concentration in mols. per liter. From this formula the hydrogen ion concentrations corresponding to the $pH$ values 3.1 and 8.5, the values referred to herein can be readily determined. For example, the $pH$ value of 3.1 corresponds to a hydrogen ion concentration of $0.8 \times 10^{-3}$ whereas the $pH$ value of 8.5 corresponds to a hydrogen ion concentration of $0.32 \times 10^{-8}$.

In the compounding of a buffer composition containing borax and acetic acid, the acetic acid is admixed with borax, the relative amounts of each compound being so proportioned that the acetic acid is present in sufficient quantity to bring the $pH$ below the value of 8.5. The amounts of borax and acetic acid used will of course vary with the $pH$ value desired.

The $pH$ value of a 0.25 N solution of boric acid is 4.7 and that of $NaH_2BO_3$ is 11.2. The addition of acetic acid to a solution of $NaH_2BO_3$ will cause a reaction between such compounds to form sodium acetate and boric acid. It is obvious from this that it would not be necessary to add sufficient acetic acid to react with all the sodium in the $NaH_2BO_3$ before the $pH$ value of the solution would be less than 8.5. The important factor in the compounding of the buffer composition is that the $pH$ value of same must not exceed 8.5.

Having thus particularly described my invention and the manner of its application, I claim the following:

1. The process of reducing the viscosity of nitro-cellulose which consists of heating the nitro-cellulose suspended in an aqueous medium containing a buffer composition capable of maintaining a $pH$ value not exceeding 8.5.

2. The process of reducing the viscosity of nitro-cellulose which consists of heating the nitro-cellulose suspended in water containing a buffer composition capable of maintaining a $pH$ value between the limits of 3.1 and 8.5.

3. The process of reducing the viscosity of nitro-cellulose which consists of heating the same in water in the presence of a buffer composition capable of neutralizing the acid liberated from the nitro-cellulose by such heating and of maintaining a $pH$ value not exceeding 8.5.

4. The process of reducing the viscosity of nitro-cellulose which consists of heating the same in an aqueous medium in the presence of a buffer composition capable of neutralizing the acid liberated from the nitro-cellulose by such heating and of maintaining a $pH$ value between the limits of 3.1 and 8.5.

5. The herein described process of permanently reducing the viscosity of nitrocellulose, which consists of heating the nitro-cellulose with water containing a buffer compound comprising borax and acetic acid.

In testimony whereof he affixes his signature.

STANLEY DE VRIES SHIPLEY.